F. DE URRUELA.
MEANS FOR ABSORBING THE REACTIONS OF THE SUSPENSION IN MOTOR CARS AND ENGINES OF ALL KINDS.
APPLICATION FILED JAN. 24, 1920.
1,381,621.
Patented June 14, 1921.
2 SHEETS—SHEET 1.
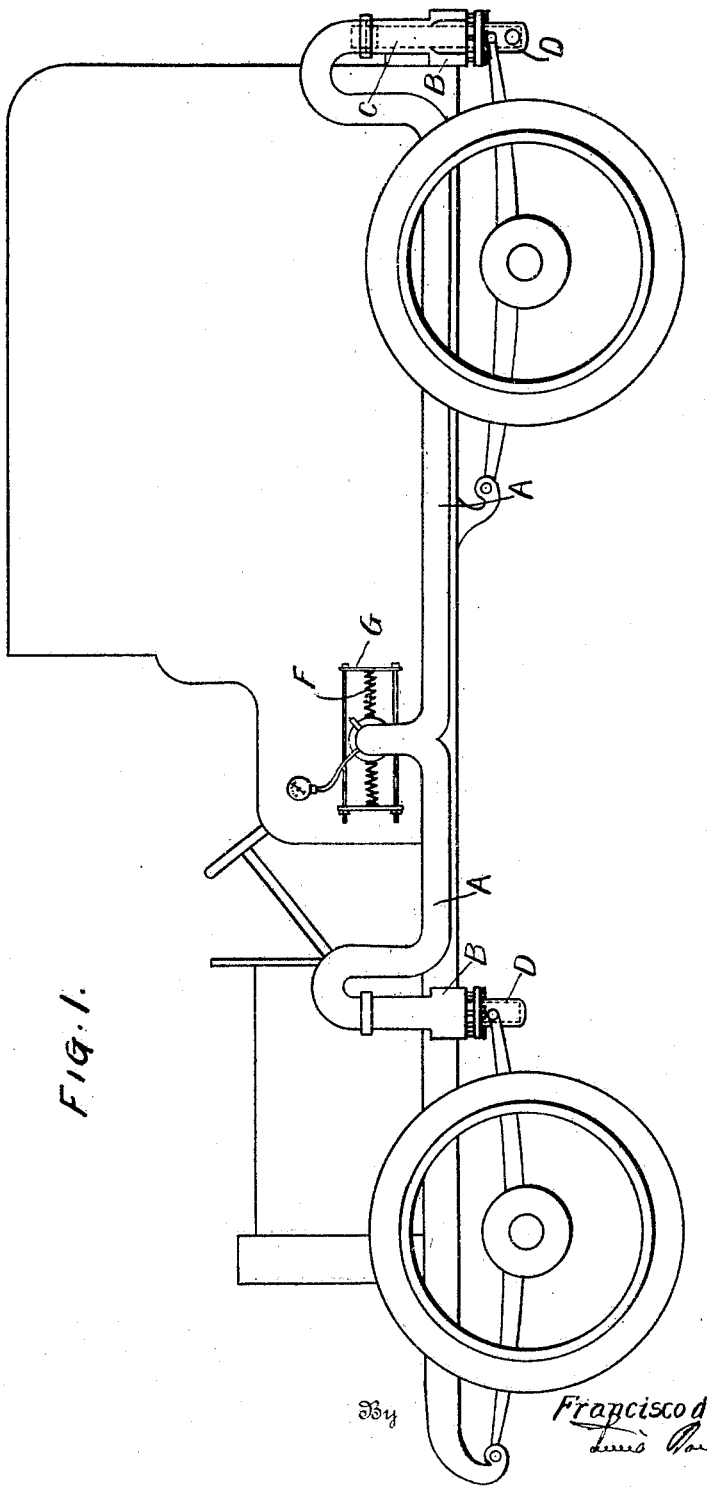

F. DE URRUELA.
MEANS FOR ABSORBING THE REACTIONS OF THE SUSPENSION IN MOTOR CARS AND ENGINES OF ALL KINDS.
APPLICATION FILED JAN. 24, 1920.
1,381,621.
Patented June 14, 1921.
2 SHEETS—SHEET 2.
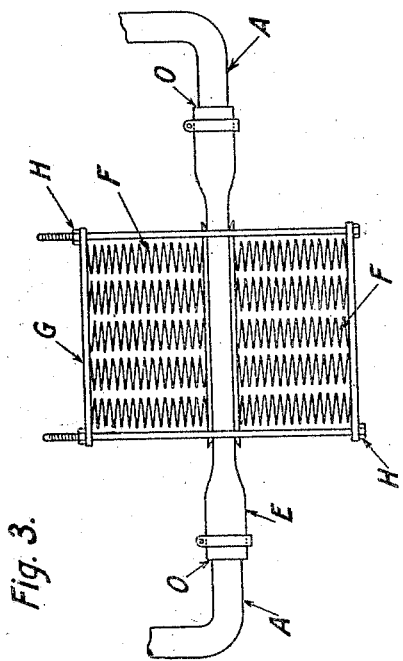
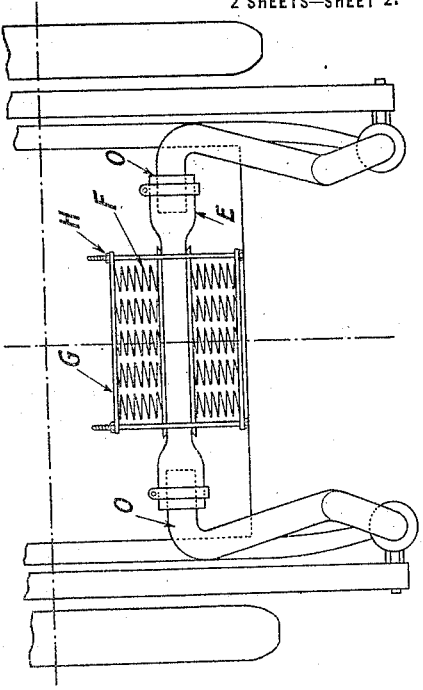
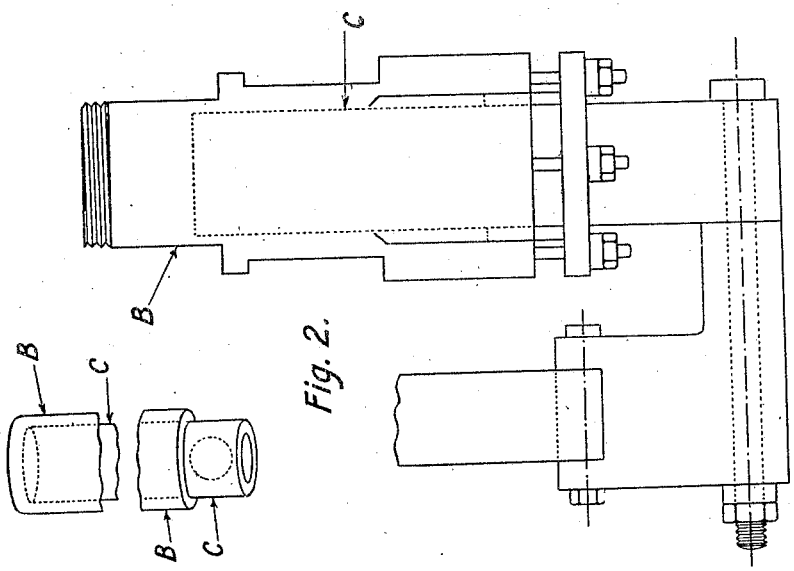
Inventor:
Francisco de Urruela
By
Attorney.

UNITED STATES PATENT OFFICE.

FRANCISCO DE URRUELA, OF MADRID, SPAIN.

MEANS FOR ABSORBING THE REACTIONS OF THE SUSPENSION IN MOTOR-CARS AND ENGINES OF ALL KINDS.

1,381,621.        Specification of Letters Patent.    Patented June 14, 1921.

Application filed January 24, 1920. Serial No. 353,908.

*To all whom it may concern:*

Be it known that I, FRANCISCO DE URRUELA, a subject of the Kingdom of Spain, residing at Madrid, Palace Hotel, Spain, have invented certain new and useful Improvements in the Means for Absorbing the Reactions of the Suspension in Motor-Cars and Engines of All Kinds, of which the following is a specification.

The purpose of the present invention, is to provide a mechanical and pneumatic device to be substituted for the pneumatic wheels or tires of motor-cars, carriages and the like, in absorbing the movements of the suspension or hanging.

Until now, it has been customary to use on motor-cars and vehicles in general, a tire shoe with a tube containing compressed air. This has, among many others, the hindrance of the contact with the irregularities or unevennesses of the road surface, of such a fragile and delicate object as a tire, exposed to the rapid deteriorations incident to cuts and other accidents caused by stones, glass, nails and other similar foreign bodies, which renders their use exceedingly costly and unreliable, both with respect to the duration of the journey and the comfort of the passengers.

With my new mechanical and pneumatic device those disadvantages disappear, because the wheel tires can be suppressed and the same or a better effect obtained, by transferring the pneumatic action to other parts of the vehicle, where frequent breakage is not likely to happen, on account of the contact with the ground or road surfaces being avoided.

The invention consists in the formation of a pneumatic chamber which resists the pressure of pistons placed in cylinders, on which the whole weight of the body rests, and the addition of a compensating apparatus designed to absorb the increase of pressure caused by violent jars or shocks of the ground, which react or rebound on the pistons.

The pneumatic chamber, is preferably formed within a piping system, elastic or rigid, which communicates with the cylinder containing the piston; and the compensating apparatus, consists preferably of a thick rubber tube interposed in the aforesaid duct system and which is flattened in the middle, due to the pressure which is exercised on it from both sides by springs, with the purpose to compensate the displacement of air produced by the pistons, when the shocks of the wheels react or rebound on them.

In order to make this invention clearly understood, I will describe it in detail, with reference to the accompanying drawings, in which, as an example only, are shown two of the several forms of execution thereof that can be adopted in practice.

In said drawings:

Figure 1, is a side view of a motor-car fitted with my invention;

Fig. 2, is, on a larger scale, a top view of the cylinder containing the piston;

Fig. 3, is a view of the preferred compensating apparatus;

Fig. 4, is a fragmentary perspective of the piston inside the cylinder, showing its construction, which is hollow but closed at the part destined to exercise pressure on the compressed gas;

Fig. 5, is a plan view of the device.

Referring particularly to the five first figures, a chamber is formed by the tube A and the cylinders B and within said chamber is introduced, through a convenient valve opening made in the most suitable place, air, gas, liquid or other equivalent under pressure.

The compressed gas etc. occupies the whole of the said tube and cylinders and, preferably, each of the latter is placed near its corresponding wheel, for instance, on the car springs, so that the whole weight of the chassis and of the car body, rest through a suitable arm on the cylinders composing the pneumatic installation.

Each of the said cylinders B has an inner diameter the same as that of the tube A, in which runs the piston C, made hollow to reduce its weight (Fig. 4), but closed in its upper part, that is: in the part where it is in contact with the compressed gas.

From the said piston C hangs a connecting rod D, designed to be adapted to the main spring, axle or convenient part of the car.

When the compressed gas enters the tube, it starts its pneumatic action on the interior of the cylinder and as its pressure drives the piston C down, from that moment the chassis is in pneumatic suspension, that is: upon the air contained in tube A and cylinder B.

In employing a compensating apparatus, the advantage attained is that the compressed fluid keeps about the same pressure, since when the wheels receive the natural shocks produced by the irregularities or unevennesses of the ground, or road, these shocks are transmitted, through the action of the piston and the intervention of the compressed element, to the compensating apparatus, which answers automatically, yielding first to the expansion and then exercising an opposed force, that compels the piston to occupy its former position.

The compensating apparatus which I have preferred to illustrate, consists in a thick rubber tube E, of special construction (Fig. 3), interposed in the elastic or rigid tube A, for instance, at O, and flattened in the middle, although it contains the pressure of the air, gas, liquid or the like, in reason to the pressure exercised on both sides of it by one or several springs F. These springs are held between two convenient plates G, joined by screws H, which facilitate the regulation of said springs, as they approach or recede from the plates.

In severe shocks, jars or vibrations, the piston C enters more than usual in the cylinder B and produces a greater pressure, which, of course, reacts or rebounds on the inner walls. This increased pressure, is transmitted to the compensating apparatus, pressing the springs in proportion to that effort, and when the effort is over, the said springs F, returning to their former position, level the pressure and oblige the piston C, by means of the compressed element, to occupy again its former position.

It is clearly understood by the foregoing that, both the form and the size of the various elements constituting this mechanical-pneumatic process or method, can be varied, without departing from the spirit of the invention, which, as stated before, consists in the arrangement of the compressed pneumatic chamber, in combination with a pressure-compensating apparatus, that can be applied inside or outside of the pneumatic element.

In the same way, it should be understood that, instead of establishing a cylindrical element for each wheel, one only for each two wheels can be arranged and each one can carry its own compensating element apart, instead of one common to all the cylinders. These cylinders can be placed in any part of the car thought convenient for their work; the piston may be adapted, by means of the connecting rods, to the axles of the wheels and the cylinder to the chassis by means of a suitable arm, suppressing in this way, if found desirable, the car springs, which would only serve then for the traction or for the unlikely case of one of the hanging or suspension apparatus working badly, when the weight of the car would fall on the main springs.

The cylinder and piston can operate separately or two or more may be connected by a tube. When they work separately, the tube containing the compressed air can have any other device. For instance: the chamber can surround the cylinder, that is to say, a second cylinder can cover it, having a large diameter, in order to contain the proportionately required air. This second cylinder is screwed on the lower part of the first, this latter having in the upper end the necessary space for the valvoline grease for obturating the air. The cylinder, and its piston with the sealing valvoline, is thus inclosed in a second cylinder, which forms the pneumatic removable chamber.

Attention should also be called to the fact that the compensating apparatus may be of a different nature to those shown in the drawings (Figs. 2 and 5). It may consist, for example, in a tube having chambers separated by plates which have graduated openings in decreasing size, in order to oppose resistance to the passage of the new increase of pressure.

Theoretically, no vertical reaction should be able to reach the chassis, because it is suspended on the very compressed air, the pressure being at the same time compensated; but this result is not achieved, if the cylinder has a short prolongation of tube, whose capacity is limited and which, moreover, is not fitted with the compensator of pressure. I give this explanation to show that an arrangement which consists, for instance, in a small cylinder containing air as a shock-cushion, should not be considered to interfere with the present invention. The prolongation of the tube of that cylinder, which can be of the same diameter, gives a greater amount of the compressed element and already constitutes by itself a factor which absorbs part of the increase of pressure that may suddenly supervene; but if a compensator is added to it, of any desired structure, great advantages will be obtained, even when working with a very small capacity of the compressed element. It is therefore clearly specified that the application of any means of compensation, including the greater capacity of the element under pressure, lies also within the scope of this invention.

These auxiliary means, are of two sorts:

1st. Natural means, obtained by the more or less and exact proportion of the air capacity used, which is determined for each different car in proportion with the weight of the chassis and body and the weight of the ordinary maximum of the load; and also with the diameter of the piston and the place of the car where the apparatus or cylinder is adapted, because it receives more or less weight. With only the air compressed in an undetermined capacity, the absorption of the shocks would not be obtained, the simultaneous use of the other elements being necessary, such as the resistance to support the weight of the load, because without the latter the pressure would have to be constantly changed by the operative. According to this invention the pressure is always the same whether with or without the load and the car is always suspended on the pneumatic device, owing to the ratio between the named means.

2nd. Mechanical means by which the walls of the chamber or air capacity are working from within to outside, enlarging the chamber capacity at any moment that the pressure becomes more violent, in consequence of a shock resulting from the displacement of the air and piston, the automatic enlargement of the chamber compensating the excess of pressure.

Furthermore, I may add that to avoid all escapes of compressed air in the cylinder holding the piston, said piston is not allowed to be in connection with the air under pressure and this is performed by means of a chamber containing liquid or some other obturating matter, which plays on the upper and closed part of the said piston; and to render the fitting between both parts more hermetic, perfect and at the same time easy-running, tow, grease and the usual accessories of pumps for liquids may be used. The piston may be of the same construction as those which are employed in pumps for liquids and may also work on the principle of pumps for compressed air, making its fitting as is common in this kind of construction. That part of the mechanism composed of the cylinder and piston described or otherwise specified, lies also within the scope of this invention, while its funtcion is based on the fundamental principle thereof.

The wheels of the vehicle may have either pneumatic, solid or iron tires and the invention may be applied, not only to motorcars, wagons, carriages of all kinds and ships, but in general, to all machines or engines which may suffer jars, vibrations, oscillations and trepidations, whether fixed or movable.

The application of this invention, can be extended:

A. To the cantaliver springs and other suspensions, in which the piston is not adapted on one end of the spring, but on the center, working as series, always interposed and separating absolutely the chassis by the pneumatic air from the shocks.

B. To cars without springs, directly between the axles and chassis.

Other prior similar patents, have not the means suggested by me to compensate and absorb the shocks.

I claim as my invention:

1. In a vehicle, the combination of a chassis; wheels for said vehicle; springs each having one end mounted directly on said chassis; and pneumatic suspension means mounted on said chassis and having means for suspending the other ends of springs, said springs being adapted to control the longitudinal and lateral movements of the chassis as usual and said pneumatic suspension means being adapted to prevent shocks and vibrations from being transmitted to said chassis from said wheels; and a pneumatic chamber in communication with said pneumatic suspension means and of variable capacity to permit of adjustment to compensate for variations in load.

2. In a vehicle, the combination of a chassis; wheels for said vehicle; springs each having one end mounted directly on said chassis; means including a compressible fluid interposed between the chassis and the other ends of said springs to prevent shocks and vibrations from being transmitted from said wheels to said chassis, and whereby the chassis is supported on said wheels; and auxiliary means connected to the last named means adapted to yield upon a predetermined compression of said fluid to absorb the more violent shocks transmitted from the wheels preventing said shocks from being transmitted to the chassis.

3. In a vehicle, the combination of a chassis; wheels for said vehicle; springs each having one end mounted directly on said chassis; means including a compressible fluid interposed between the chassis and the other ends of said springs to prevent shocks and vibrations from being transmitted from said wheels to said chassis, and whereby the chassis is supported on said wheels; auxiliary means connected to the last named means adapted to yield upon a predetermined compression of said fluid to absorb the more violent shocks transmitted from the wheels preventing said shocks from being transmitted to the chassis; and means for regulating said auxiliary means according to conditions so that it will absorb more violent or less violent shocks.

4. In a vehicle, the combination of a chassis; wheels for said vehicle; means including a compressible fluid interposed between the chassis and the wheels to prevent shocks and vibrations from being transmitted from said wheels to said chassis and whereby the chassis is supported on said wheels; and auxiliary means connected to the last named means adapted to yield upon a predetermined compression of said fluid to absorb the more violent shocks transmitted from the wheels and preventing said shocks from being transmitted to the chassis.

5. In a vehicle, the combination of a chassis; wheels for said vehicle; means including a compressible fluid interposed between the chassis and the wheels to prevent shocks and vibrations from being transmitted from said wheels to said chassis and whereby the chassis is supported on said wheels; auxiliary means connected to the last named means adapted to yield upon a predetermined compression of said fluid to absorb the more violent shocks transmitted from the wheels and preventing said shocks from being transmitted to the chassis; and means for regulating said auxiliary means according to conditions so that it will absorb more violent or less violent shocks.

6. In a vehicle, the combination of a chassis; wheels for said vehicle; means including a compressible fluid interposed between the chassis and the wheels to prevent shocks and vibrations from being transmitted from said wheels to said chassis and whereby the chassis is supported on said wheels; auxiliary means connected to the last named means adapted to yield upon a predetermined compression of said fluid to absorb the more violent shocks transmitted from the wheels and preventing said shocks from being transmitted to the chassis; means for indicating the state of compression of said fluid to determine variations in load of the vehicle; and means for regulating said auxiliary means according to the varying conditions indicated by said indicating means so that it will properly absorb shocks under varying conditions.

7. In a vehicle, the combination of a chassis; wheels for said vehicle; and means interposed between the chassis and wheels comprising a metallic chamber of relatively great capacity having a cylinder at one end, a piston working in said cylinder and connected with the wheel, a compressible fluid contained in said chamber and said cylinder against which the piston is adapted to operate in supporting the chassis, the compressible fluid absorbing shocks and vibrations transmitted from said wheel, a flexible element connected to said metallic chamber and adapted to expand upon a predetermined compression of said fluid contained in said chamber, whereby violent shocks are absorbed, and means for variably controlling said flexible member to compensate for varying conditions.

8. In a vehicle, the combination of a chassis; wheels for said vehicle; and means interposed between the chassis and wheels comprising a metallic chamber of relatively great capacity having a cylinder at one end, a piston working in said cylinder and connected with the wheel, a compressible fluid contained in said chamber and said cylinder against which the piston is adapted to operate in supporting the chassis, the compressible fluid absorbing shocks and vibrations transmitted from said wheel, a flexible tube connected to said metallic chamber and adapted to expand upon a predetermined compression of said fluid contained in said chamber, whereby violent shocks are absorbed, and adjustable springs for variably controlling said flexible tube to compensate for varying conditions.

9. In a vehicle, the combination of a chassis; wheels for said vehicle; and means interposed between the chassis and said wheels and comprising for each wheel a metallic chamber of relatively great capacity having a cylinder at one end, a piston working in said cylinder and connected with the wheel, a compressible fluid contained in said chamber and said cylinder against which the piston is adapted to operate in supporting the chassis, the compressible fluid absorbing shocks and vibrations transmitted from said wheel said metallic chambers for each wheel extending to a central point, and a flexible tube located at said central point and connected with each of said metallic chambers said flexible tube being adapted to expand upon a predetermined compression of said fluid contained in said chamber whereby violent shocks are absorbed, and means for variably controlling said flexible member to compensate for varying conditions.

10. In a vehicle, the combination of a chassis; wheels for said vehicle; and means interposed between the chassis and the wheels comprising a metallic chamber of relatively great capacity having a cylinder at one end, a piston working in the cylinder and connected with a wheel, a pneumatic chamber in communication with said means and of variable capacity to permit of adjustment to compensate for variations in load and a liquid obturation and suitable packing for effecting a fluid-tight joint between said piston and said cylinder.

In testimony whereof I affix my signature.

FRANCISCO DE URRUELA.

Witnesses:
FRANCISCO DE EBALEUM,
MANUEL MARKEY.